United States Patent [19]

Ekama et al.

[11] 3,976,264

[45] Aug. 24, 1976

[54] PNEUMATIC TUBE SYSTEM SWING TUBE TERMINAL CONSTRUCTION

[75] Inventors: Peter J. Ekama, Malvern; Kenneth R. Hansen, Massillon; Charles B. Barnett, Akron, all of Ohio

[73] Assignee: Diebold, Incorporated, Canton, Ohio

[22] Filed: Mar. 12, 1975

[21] Appl. No.: 557,497

[52] U.S. Cl. .................................. 243/19; 243/2
[51] Int. Cl.² ...................................... B65G 51/32
[58] Field of Search ..................... 243/1, 19–31, 243/38

[56] References Cited
UNITED STATES PATENTS

| | | | |
|---|---|---|---|
| 585,498 | 6/1897 | Batcheller | 243/22 X |
| 595,755 | 12/1897 | Batcheller | 243/19 X |
| 681,057 | 8/1901 | Johnson | 243/22 |
| 706,639 | 8/1902 | Cowley | 243/22 |
| 709,434 | 9/1902 | Bogardus et al. | 243/19 |
| 714,865 | 12/1902 | Collis et al. | 243/19 |
| 1,061,034 | 5/1913 | Batcheller | 243/21 |
| 1,112,304 | 9/1914 | Loebenberg | 243/19 |
| 3,232,559 | 2/1966 | Grosswiller et al. | 243/2 |

*Primary Examiner*—John J. Love
*Assistant Examiner*—James L. Rowland
*Attorney, Agent, or Firm*—Frease & Bishop

[57] ABSTRACT

A terminal for a pneumatic tube system having a tube section pivotally mounted within the terminal for swinging movement between first and second positions. The swing tube communicates with the open end of a carrier send and receive tube which connects the terminal with the pneumatic tube system when in the first position. The swing tube communicates with a carrier delivery mechanism when in the second position which provides access to the carrier by a bank teller or customer. A bellcrank mechanism has a roller mounted on the extended end of a first bellcrank lever which is engaged for sliding movement in a camming slot formed in a cam block mounted on the swing tube. The extended end of a second bellcrank lever is connected to a motor driven slide rod for actuation of the bellcrank mechanism to pivot the swing tube between the first and second positions through the roller-cam engagement. The pneumatic tube system air supply communicates with the pivoted end of the swing tube and applies a lower air-pressure or vacuum for drawing a carrier into and holding it in the swing tube during movement of the swing tube between the first and second positions. The direction of airflow or supply then is reversed to drive the carrier from the swing tube into the carrier delivery mechanism or to propel the carrier into and along the pneumatic tube for delivery to a distant terminal.

17 Claims, 13 Drawing Figures

PNEUMATIC TUBE SYSTEM SWING TUBE TERMINAL CONSTRUCTION

BACKGROUND OF THE INVENTION

1. Field of the Invention

The invention relates to pneumatic tube systems and particularly to terminal constructions for such systems. In particular, the invention relates to a terminal construction preferably for use in a single tube pneumatic tube system in which a swing tube section is pivotally mounted in the terminal for changing the direction of movement of incoming and outgoing carriers and for presentation of the carrier to the user of the system to eliminate costly and space occupying curved tube bend sections.

2. Description of the Prior Art

Many types of terminal constructions are used in pneumatic tube systems depending upon the particular requirement of the system, the types of material to be conveyed between terminals, and the position in which the terminals are installed in relation to the location of the pneumatic tube system tubes. Prior terminals in many installations have been large and unsightly because of the need for providing space within the terminal to form a bend, usually 90°, in the incoming pneumatic tube. Such bends are required to change the orientation of a carrier from its usual incoming vertical position to a horizontal position for delivery to a customer or teller, such as shown in U.S. Pat. Nos. 2,763,446 and 1,660,293.

Various terminal constructions and arrangements have been used in an attempt to eliminate such increased terminal size required for forming such bends. The tube bends normally are formed adjacent the terminal, sometimes below ground which is costly and which presents maintenance problems. Alternatively, the tube is formed with an enlarged diameter at the bend area to reduce the arcuate length usually required. This also presents problems in securing satisfactory sealing of the carrier and carrier wear rings with the tube walls at the bend, and occasionally results in the carrier becoming wedged in the reduced bend radius.

Many types of swing tube arrangements have been used in pneumatic tube systems for switching between branch lines in the system, such as shown in U.S. Pat. Nos. 3,281,093, 3,367,603 and 3,762,664. These swing tube arrangements, however, are not located in or formed as part of a terminal, and they do not provide for changing the direction of carrier movement from vertical to horizontal and vice versa within the confined space of a terminal.

A need, thus has existed for a pneumatic tube system terminal construction which enables the direction of carrier travel to be changed within a terminal from vertical to horizontal without a 90° tube bend heretofore required, thereby reducing the size of the terminal, which terminal construction performs satisfactorily in a single tube pneumatic tube system, and which terminal construction may be used in conjunction with different types of mechanism for delivery of the carrier from the terminal to a customer or teller.

SUMMARY OF THE INVENTION

Objectives of the invention include providing a swing tube terminal construction for a pneumatic tube system for changing the direction of carrier travel within the terminal generally between vertical and horizontal directions without the use of a 90° tube bend; providing such a swing tube terminal construction which can be adapted for use with different types of carrier delivery mechanisms, and which can be adapted for use and communication with pneumatic tube lines entering the terminal from many different directions; providing such a swing tube terminal construction using a relatively simple bellcrank lever actuating mechanism controlled preferably by worm gear motor means in conjunction with a cam track on the swing tube, which mechanism is relatively maintenance free and which eliminates complicated switching arrangements requiring close manufacturing tolerances and field adjustments; providing such a swing tube terminal construction having override protection between the bellcrank actuating mechanism and the swing tube cam track to prevent damage to the equipment and to eliminate frequent field adjustments; and providing a swing tube terminal construction which achieves the stated objectives in a simple, effective and inexpensive manner, and which solves problems and satisfies needs existing in the art.

These and other advantages may be obtained by the swing tube terminal construction, the general nature of which may be stated as including a housing having a carrier access means; a system tube communicating with the housing for movement of a pneumatic carrier into and out of the housing; swing tube means having an open first end and a closed second end; means pivotally mounting the swing tube means within the housing for movement between first and second positions; the swing tube means first end communicating with the system tube when the swing tube means is in the first position, and the first end communicating with the carrier access means when the swing tube means is in the second position; airflow supply means operatively communicating with the swing tube means pivotal mounting means providing the motive pressure for movement of a carrier into and out of the swing tube means; drive means mounted within the housing and operatively connected to the swing tube means for pivoting the swing tube means between the first and second positions; means retaining a carrier in the swing tube means during movement between the first and second position; airflow control means for selectively regulating the direction of the motive pressure in the swing tube means for ejecting a carrier from the swing tube means into the system tube or to a position adjacent the carrier access means; the swing tube means drive means includes a bellcrank having first and second levers; motor means operatively connected to one of the levers with the other lever being operatively engaged with the swing tube means, whereby the bellcrank pivots the swing tube means upon actuation of the motor means; the swing tube means pivotal mounting means includes a pair of sleeves extending in diametrically opposite directions outwardly from the tube means, and bearing means engaged with the sleeves for pivotally supporting the swing tube means within the housing; means connecting the airflow supply means to the swing tube means through the pivotal mounting sleeves adjacent the closed second end of the swing tube means; and the motive pressure of the airflow supply means retaining a carrier in the swing tube means during swing tube movement between the first and second positions.

BRIEF DESCRIPTION OF THE DRAWINGS

A preferred embodiment of the invention — illustrative of the best mode in which applicants have contemplated applying the principles — is set forth in the following description and shown in the drawings, and is particularly and distinctly pointed out and set forth in the appended claims.

Similar numerals refer to similar parts throughout the drawings.

DESCRIPTION OF THE PREFERRED EMBODIMENT

Figure 1:
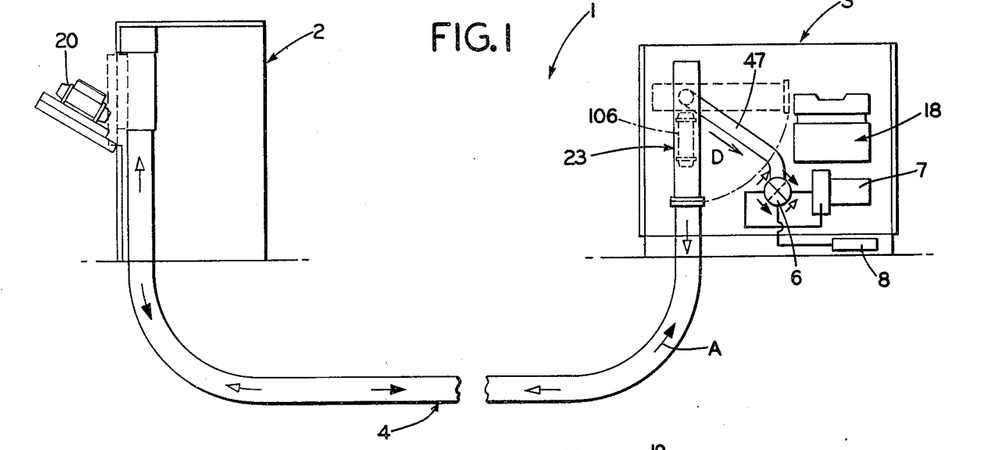
FIG. 1 is a general diagrammatic view showing a teller and customer terminal in a single tube pneumatic system, with the improved swing tube terminal being shown at the right hand position.

A typical pneumatic tube system for transacting business operations such as remote banking, is illustrated diagrammatically at 1 in FIG. 1, and includes a teller terminal 2 and a customer terminal 3. Terminals 2 and 3 are connected by a single penumatic tube 4 with the direction of carrier travel therethrough being controlled by an air shifter 6, which may be of the type shown in U.S. Pat. No. 3,232,559. A blower 7 provides the motive pressure for tube 4 and is operatively connected with shifter 6, and may include a muffler 8.

Figure 2:
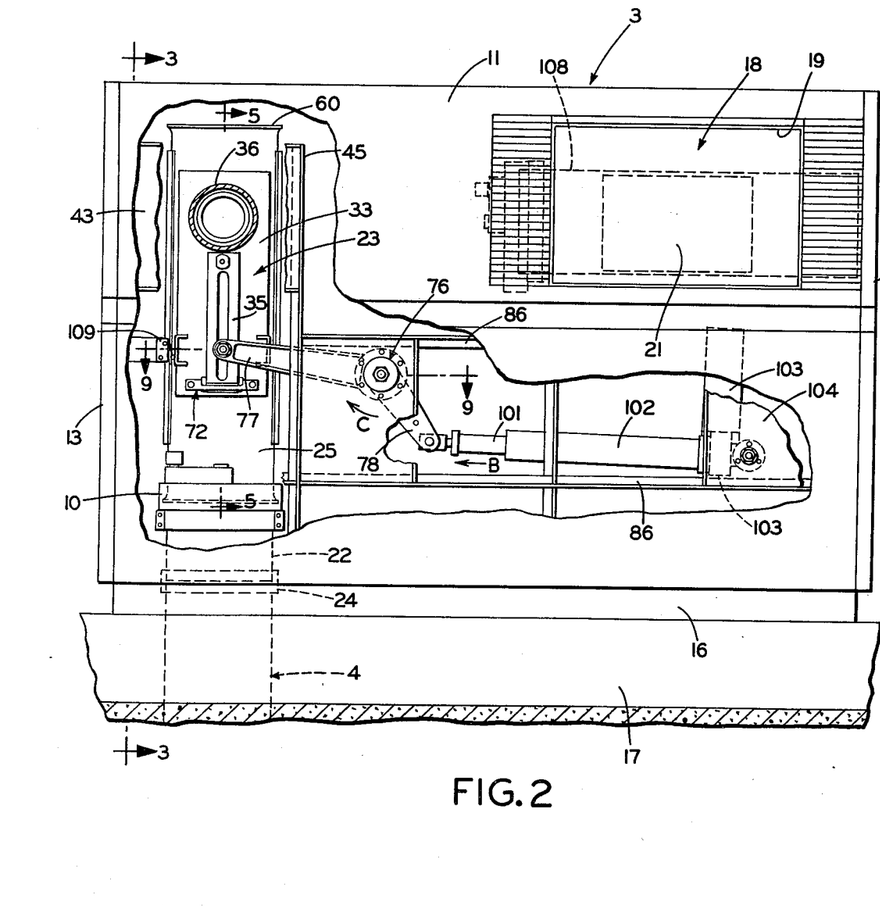
FIG. 2 is an enlarged fragmentary front view with portions broken away, of the swing tube terminal, with the swing tube in vertical carrier send-receive position.
Figure 3:
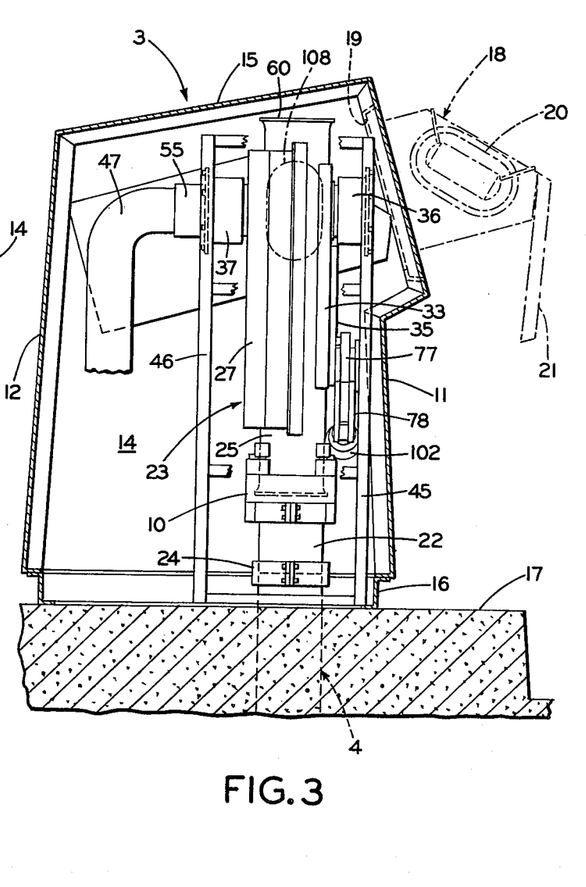
FIG. 3 is a fragmentary sectional view taken on line 3—3, FIG. 2, with a carrier delivery drawer being shown in dot-dash lines and in extended position.

The swing tube terminal of the invention is illustrated and described as a part of the customer terminal 3, although it can be incorporated satisfactorily into the teller terminal 2. Swing tube terminal 3 preferably includes a rectangularly shaped housing as shown in FIGS. 2 and 3, formed by front and rear walls 11 and 12, side walls 13 and 14, and top wall 15. Terminal 3 has base flanges 16 and is mounted on a supporting platform 17 for receiving the incoming pneumatic tube line 4.

Figure 4:
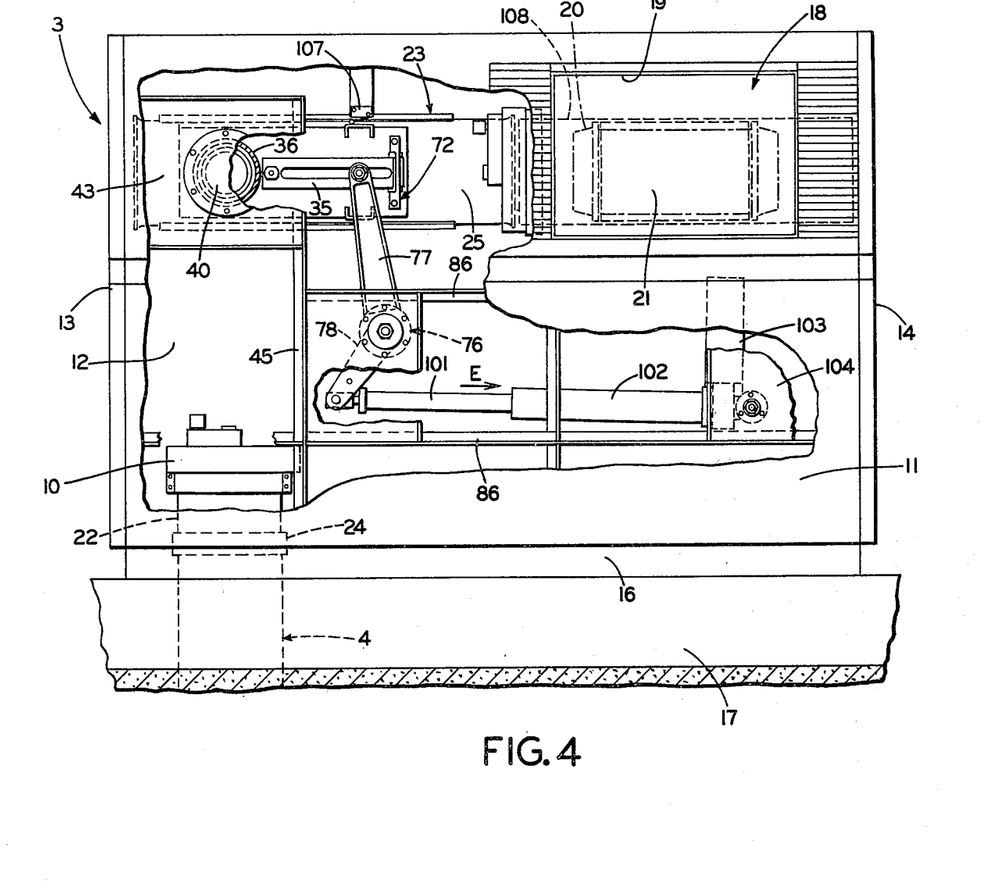
FIG. 4 is a view similar to FIG. 2, showing the swing tube in horizontal carrier access position.

A penumatic carrier delivery drawer 18 is located in the right-hand end section of terminal 3 (FIGS. 1, 2 and 4). Drawer 18 is operated by an appropriate control mechanism for extension outwardly through an opening 19 formed in front wall 11 to a location adjacent a customer, to provide access to a carrier 20 contained therein. A door 21 may be attached to the front portion of the drawer for closing opening 19 when drawer 18 is in retracted position, as shown by dot-dash lines in FIG. 3. Door 21 may move outwardly with drawer 18 upon actuation of the delivery mechanism. The particular carrier delivery drawer assembly 18 shown forms no part of the present invention and need not extend outwardly for access by a customer. Numerous other types of delivery means for access to the carrier by a customer may be used with swing tube terminal 3 without departing from the concept of this invention.

Pneumatic tube 4 preferably enters the bottom of terminal 3 and extends vertically upwardly through platform 17 into the interior of terminal 3, and terminates a short distance above platform 17. A section 22 of pneumatic tube is attached by a clamp 24 to the end of tube 4 and has air seal means 10 mounted on the end thereof.

In accordance with the invention, a swing tube indicated generally at 23 is pivotally mounted within terminal 3 for swinging movement between first and second positions, generally through an angle of approximately 90°. Tube 25, when in the first or send-receive position (FIG. 2), is shown as extending vertically and is axially aligned with tube end 22 of tube 4 for receiving or discharging a carrier 20 from and into system tube 4. Swing tube 23, when in the second or carrier access position (FIG. 4) is shown as extending horizontally and is aligned with delivery drawer mechanism 18 for receiving or discharging a carrier 20 from and into drawer 18.

Figure 7:
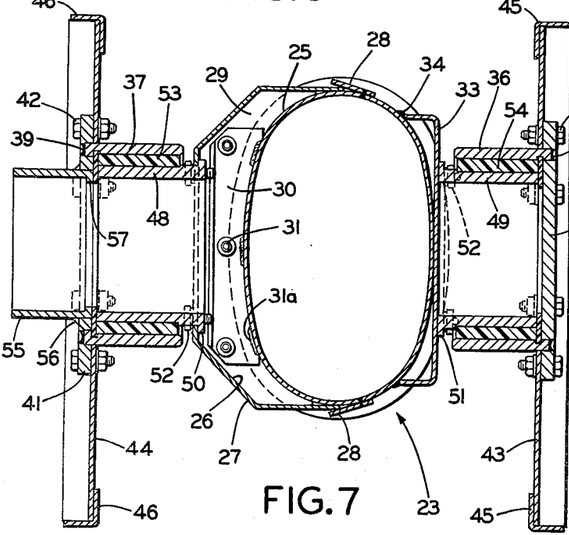
FIG. 7 is an enlarged fragmentary sectional view of the swing tube pivotal mounting means taken on line 7—7, FIG. 5.
Figure 8:
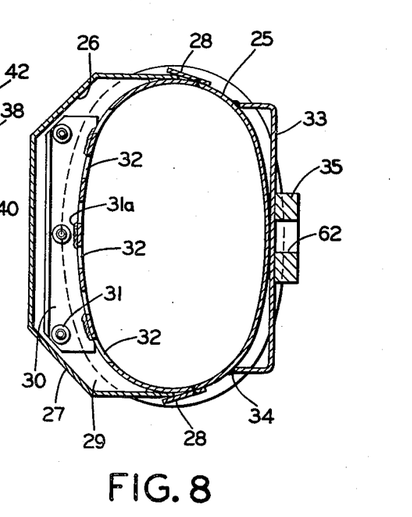
FIG. 8 is an enlarged fragmentary sectional view taken on line 8—8, FIG. 5.

Swing tube 23 (FIGS. 5, 6, 7 and 8) includes a short section of tube 25 which has the same dimensions and configuration as that of tube 4. A baffle chamber 26 is formed on and surrounds a half section of tube 23 and extends axially along the circumference thereof. Baffle chamber 26 is formed by a generally U-shaped sheet metal member 27 secured on tube 25 by a pair of metal strips 28 which are welded or otherwise joined along diametrically opposite sides of tube 25. The upper and lower ends of baffle chamber 26 are closed by a pair of arcuate flanges 29 which are integral with U-shaped member 27. End flanges 29 are attached to tube 25 by a pair of brackets 30 (FIGS. 7 and 8). Brackets 30 are connected by bolts 31 to end flanges 29 and are welded at 31a to tube 25. A plurality of elongated openings 32 are formed in tube 25 for communication with baffle chamber 26, the purpose of which is discussed below.

A U-shaped channel 33 is mounted on tube section 25 preferably by tackwelds 34 and extends axially along tube 25 diametrically opposite baffle chamber 26. Channel 33 provides a support for pivotally mounting swing tube 23 within terminal 3 and for supporting a cam block 35.

Figure 5:
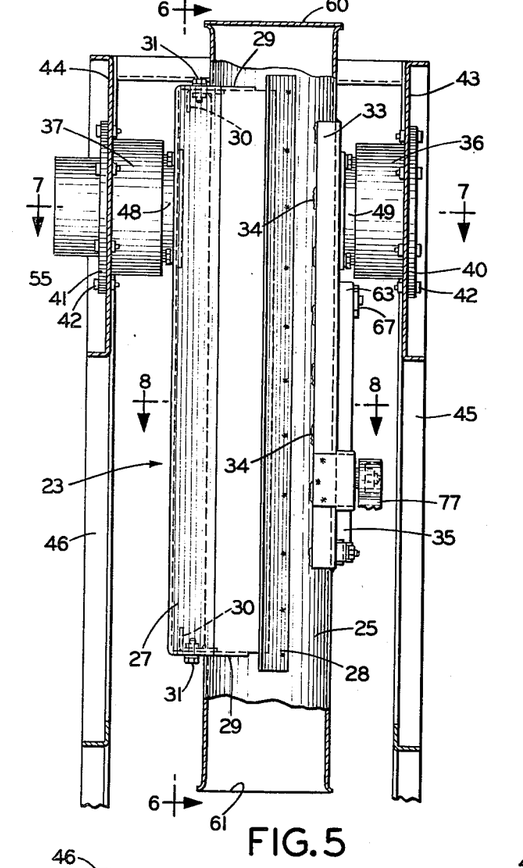
FIG. 5 is an enlarged fragmentary sectional view of the swing tube taken on line 5—5, FIG. 2.
Figure 6:
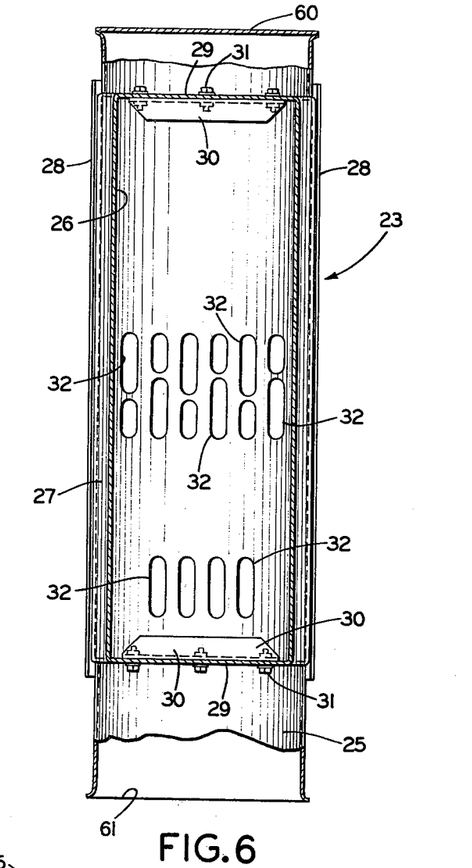
FIG. 6 is a fragmentary sectional view taken on line 6—6, FIG. 5.

Swing tube 23 is pivotally mounted within terminal 3 on a pair of cylindrical sleeves 36 and 37 (FIGS. 5 and 7). Sleeves 36 and 37 are inserted into circular grooves 38 and 39 formed in circular hubs 40 and 41, respectively. Hubs 40 and 41 are bolted at 42 to a pair of mounting plates 43 and 44 which extend between pairs of vertically extending angle members 45 and 46.

Figure 10:
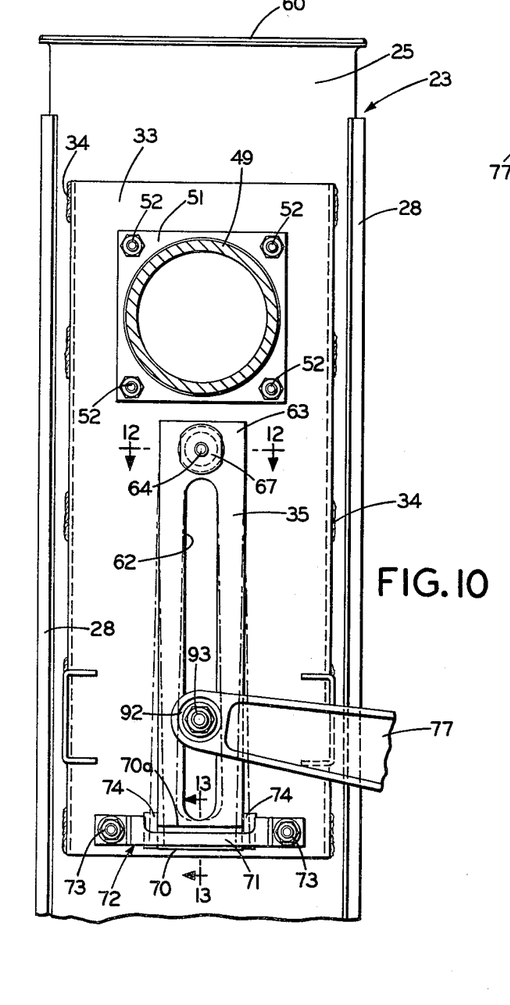
FIG. 10 is a fragmentary sectional view taken on line 10—10, FIG. 9.

A second pair of cylindrical sleeves 48 and 49 having rectangular flanges 50 and 51 formed at one end thereof are mounted by bolts 52 on the inner surface of baffle member 27 and on the outer surface of mounting channel 33, respectively. Sleeves 48 and 49 are located on diametrically opposite sides of swing tube 23 and extend outwardly therefrom (FIGS. 5, 7 and 10). Sleeves 48 and 49 are telescopically received with bearing sleeves 53 and 54 which are mounted within outer sleeves 37 and 36, respectively, for swinging pivotal movement of swing tube 23 with respect to fixed sleeves 36 and 37. Bearing sleeves 53 and 54 preferably are formed of nylon or other friction reducing material.

A pneumatic tube coupling collar 55 is welded at 56 to hub 41 (FIG. 7), and is axially aligned with inner sleeve 48. Coupling 55 extends outwardly from mounting plate 44 and is adapted for connection to an end of air line 47. Air line 47 is connected to an air shifter 6 and supplies the vacuum or air pressure to swing tube 23 and system tube 4, providing the motive pressure for movement of a carrier between terminals 2 and 3. Mounting hub 41 is formed with a circular opening 57 concentric with cylindrical sleeves 48 and 55 to provide an air passage from blower 7 and air shifter 6, through air line 47 and baffle chamber 26 into tube section 25.

The pivotal mounting means for swing tube 23 is located adjacent the upper end of tube section 25 when swing tube 23 is in vertical position (FIGS. 2 and 5). A plate 60 closes the upper end of tube 25 with the opposite tube end 61 being open for receiving and discharging carriers.

Cam block 35 extends in a longitudinal direction along tube section 25 parallel to the tube axis, and is mounted on the outer surface of channel 33 for limited swinging movement thereon, as shown by dot-dash lines in FIG. 10.

Figure 12:
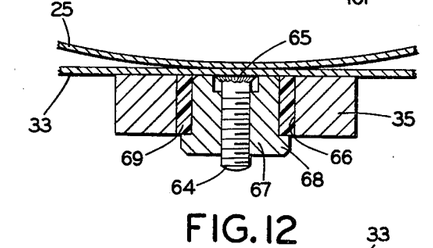
FIG. 12 is an enlarged fragmentary sectional view taken on line 12—12, FIG. 10.

Cam block 35 preferably has a rectangular shape and is formed with a longitudinal cam slot 62 (FIG. 10) which extends generally throughout the length of block 35. End 63 of block 35 which is adjacent the pivotal mounting means for tube 25 is mounted on channel 33 by a stud-bolt arrangement shown in FIG. 12. A threaded stud 64 is welded to channel 33 at 65 and extends upwardly through a circular opening 66 in block 35. A clamping nut 67 having a flanged top 68 engages a nylon bushing 69 telescopically mounted within opening 66 to clamp cam block end 63 to channel 33. Bushing 69 enables block 35 to have limited pivotal or swinging movement with respect to stud 64 and clamping nut 67.

Figure 13:
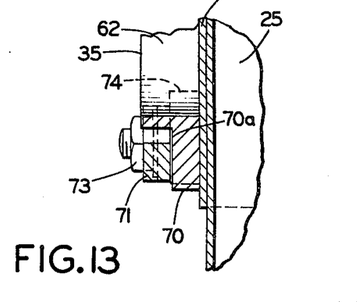
FIG. 13 is an enlarged fragmentary sectional view taken on line 13—13, FIG. 10.

The opposite or swinging end 70 of block 35 is formed with a stepped section 70a (FIG. 13) which is slidably received beneath a cross member 71 of a U-shaped clamp 72 (FIG. 10). Clamp 72 is attached by bolts 73 to channel 33. A pair of resilient pads 74 are mounted on channel 33 beneath cross member 71 at the ends thereof, with pads 74 being located on opposite edges of end 70 of cam block 35. Thus, swinging end 70 of cam block 35 is restrained from transverse movement away from channel 33 and is confined to a limited swinging movement within clamp 72. Pads 74 maintain cam block 35 centered on tube 25 as well as providing override protection for the actuating mechanism.

Figure 9:
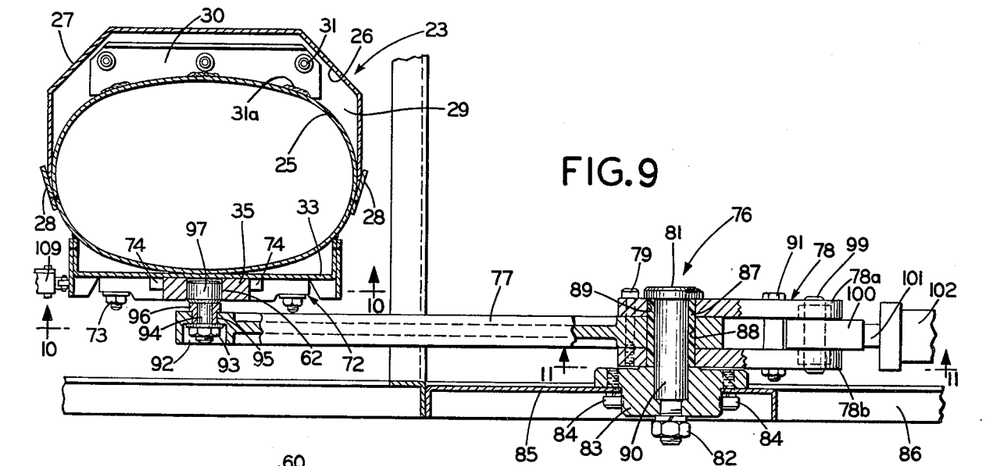
FIG. 9 is an enlarged fragmentary sectional view taken line 9—9, FIG. 2.
Figure 11:
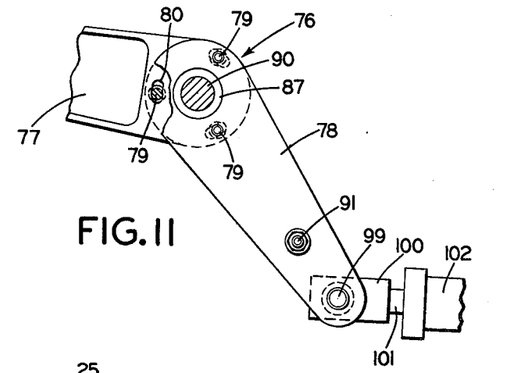
FIG. 11 is a fragmentary sectional view of the bellcrank lever actuating mechanism, taken on line 11—11, FIG. 9.

The actuating mechanism for swing tube 23 is shown generally in FIGS. 2, 4 and 9, and includes a bellcrank 76 having first and second levers 77 and 78. Levers 77 and 78 are attached to each other by bolts 79 (FIG. 11) which extend through elongated openings 80 to permit adjustment of the angle between the levers prior to tightening bolts 79.

Bellcrank 76 is pivotally mounted within terminal 3 by a stud shaft 81 (FIG. 9) which is attached by a nut 82 to a mounting block 83. Mounting block 83 is mounted by bolts 84 on a plate 85 which extends between a pair of horizontally extending angle members 86 (FIG. 4). A bushing 87 preferably is located within aligned openings 88 and 89 formed in the joined ends of levers 77 and 78 for sliding rotational engagement with a smooth portion 90 of stud shaft 81.

The end of lever 77 adjacent pivot shaft 81 is received between the yoke-like end of lever 78. Lever 78 is formed by a pair of members 78a and 78b which are joined together by a pin 91. The swinging end of lever 77 is formed with a recess 92 (FIG. 9) for receiving nut 93 and the bolt end of a cam roller shaft 94 which extends through an opening 95 formed in the recessed end of lever 77. A spacer sleeve 96 preferably surrounds shaft 94 with a bearing roller 97 being mounted on the end of shaft 94 for rolling engagement in cam slot 62 of cam block 35.

The swinging end of lever 78 is pivotally connected by a pin 99 to a clevis 100 mounted on the reduced end of an actuating rod 101. Actuating rod 101 is mounted within a cylindrical housing 102 for linear movement into and out of the housing by means of a worm gear drive motor 103 mounted at the opposite end of housing 102 (FIGS. 2 and 4). Worm gear motor 103 is mounted on a plate 104 (FIG. 4) which extends between spaced horizontal cross members 86.

The operation of swing tube 23 within terminal 3 is set forth below. Swing tube 23 when in the vertical position of FIG. 2 communicates with end section 22 of tube 4 and is pneumatically connected thereto by air seal means 10 for receiving a carrier 20 being dispatched to terminal 3. Actuating rod 101 will be in the retracted position of FIG. 2 with cam roller 97 being generally adjacent the swinging end of cam block 35. Air shifter 6 is positioned so that a vacuum is created within tube 4 by drawing the air through tube 4 in the direction of Arrow A (FIG. 1) upwardly through swing tube section 25, through baffle openings 32, baffle chamber 26, tube coupling 55, and then through air line 47 to air shifter 6.

A carrier 20 dispatched from teller terminal 2 is drawn along tube 4 in the direction of Arrow A by the vacuum or motive pressure created in tube 4 by blower 7. The carrier upon arrival at terminal 3 is drawn upwardly into swing tube 23 by the airflow through tube 25 and tube coupler 55, and comes to rest within tube 25, in the position shown by dot-dash lines 106 (FIG. 1). Baffle openings 32 (FIG. 6) reduce and nearly eliminate the force of the vacuum adjacent the closed end of tube section 25 by changing the direction of the motive pressure or force from its incoming axial direction to an outwardly transverse direction. Thus, the force and speed of an incoming carrier 20 is reduced sufficiently by this change of direction of the motive pressure within tube 25, so that a carrier, even if it should strike closed end plate 60 of tube 25 would not have sufficient force to damage the carrier or tube. This transverse outwardly direction of the vacuum force within tube 25 also maintains and holds a carrier suspended within tube 25 without additional mechanical means, even during movement of swing tube 23 between the first and second positions.

A control switch (not shown) is actuated upon arrival of carrier 20 within swing tube 23 which energizes worm gear motor 103. Motor 103 moves actuating rod 101 outwardly in the direction of Arrow B, FIG. 2, pivoting bellcrank 76 in the clockwise direction of Arrow C. The swinging movement of lever 77 together with the sliding rolling engagement of cam roller 97 in cam slot 62, pivots swing tube 23 on sleeves 36 and 37 from the vertical position of FIG. 2 to the horizontal position of FIG. 4. Swing tube 25 contacts and actuates a limit switch 107 upon reaching the horizontal position of FIG. 4 to deenergize motor 103. Carrier 20 remains suspended within tube 25 during this swinging movement by the vacuum which is maintained in tube 25 by blower 7, through air line 47 and tube coupling 55.

Air shifter 6 then reverses the direction of airflow through tube 4 and air line 47 by the appropriate control mechanism which is energized automatically upon the deenerization of motor 103. Air then is blown into tube 25 through coupling 55, baffle openings 32 and air line 47. Carrier 20 is "blown" or moved out of tube 25 by the incoming air, through a connecting tube-like section 108 of delivery drawer 18 (FIG. 4). The control mechanism for drawer 18 then is energized automatically by sensing the arrival of a carrier 20 to move the drawer 18 outwardly for access by a customer. After completion of the particular banking transaction, either the teller or customer will initiate return of drawer 18 to its retracted position within terminal 3.

Actuation of the appropriate return mechanism for drawer 18 will reverse automatically the airflow direction through air shifter 6. The air is drawn in the direction of Arrow D (FIG. 1) through air line 47 from swing tube 23 toward shifter 6 producing a vacuum in tube 23. The vacuum pneumatically withdraws the carrier from within delivery drawer 18 back into tube section 25. Carrier 20 upon arrival in tube 25 trips a control switch actuating motor 103 which retracts rod 101 into housing 102 in the direction of Arrow E (FIG. 4). Retraction of rod 101 rotates bellcrank 76 which pivots swing tube 23 from its former horizontal position of FIG. 4 back to the vertical position of FIG. 2 by means of cam roller 97 moving along cam slot 62. Carrier 20 is maintained suspended within tube section 25 by the vacuum existing in air line 47 and tube coupling 55.

Swing tube 23 upon vertical alignment with pneumatic tube end section 22 contacts a limit switch 109 (FIG. 2) which deenergizes motor 103. Actuation of switch 109 also operates air shifter 6 to reverse the airflow direction. The airflow then is in a direction opposite to that of Arrow D, FIG. 1, in air line 47 and flows into tube 25. Carrier 20 is propelled out of tube section 25, and through tube section 22 and tube 4 toward teller terminal 2. Swing tube 23 will remain in the vertical send-receive position of FIG. 2 until motor 103 again is actuated by the arrival of a carrier within the swing tube.

The above described operational sequence appears to consist of a series of individual steps requiring considerable time to complete. However, in actual operation of swing tube terminal 3, actuation and movement of swing tube 23 from the vertical receive position of FIG. 2 to the horizontal delivery position of FIG. 4, with the subsequent operation of drawer 18 to that of FIG. 3, is performed in a continuous smooth sequence of operations requiring seconds to complete. Likewise, return of the carrier from its extended drawer position of FIG. 3, and subsequent rotation of swing tube 23 from its horizontal position to its vertical position, accompanied by the air shift change, again, is performed within seconds.

The pneumatic tube system 1 incorporating swing tube terminal 3 is described above as operating with a pressure-vacuum arrangement to provide the motive pressure for the system operation. Swing tube terminal 3 will perform equally effective when the system is operated under a pressure-pressure or a vacuum-vacuum arrangement. Thus, swing tube terminal 3 can be used in various pneumatic tube systems without any substantial modifications being required. Additional air lines extending between the air shifter and terminals 2 and 3 will permit pressure-pressure or vacuum-vacuum arrangements to be used.

An important feature of swing tube terminal 3 is the particular mounting and arrangement of cam block 35 to provide override protection for the bellcrank-swing tube arrangement. Any continued rotational force of cam roller 97 after alignment of swing tube 23 with tube sections 22 or 108 will be absorbed by resilient pads 74 at swinging end 70 of cam block 35, upon the slight pivotal sliding movement of the swinging end of cam block 35 within clamp 72.

The swing tube terminal construction 3 has a number of advantageous features. The need is eliminated for the formation of a 90° bend radius within a terminal in order to change the direction of a carrier from a usual incoming vertical direction to a horizontal direction for delivery to a customer or teller. Furthermore, the actuating mechanism and swing tube arrangement consist of a relatively few parts and is performed by relatively simple mechanical operations.

Another advantage of swing tube terminal 3 is the ability to incorporate into a terminal various types of delivery drawer mechanisms for use with swing tube 23. The airflow through swing tube 23 will push a carrier out of the open tube end into any type of delivery mechanism, whether it be to a customer, teller, or even for deposit in a collection receptacle.

Likewise, incoming pneumatic tube 4 need not enter terminal 3 adjacent front wall 11 as shown in FIG. 2, but can be located adjacent back wall 12 by use of a different type delivery drawer arrangement. Also, incoming pneumatic tube 4 can enter teller terminal 3 from above or at various other angles, with the arc through which swing tube 23 is rotated being adjusted accordingly. Swing tube 23 likewise, need not be in a horizontal position as illustrated in FIG. 4 when delivering a carrier to a customer or teller. Conceivably, incoming system tube 4 may be in a horizontal position with swing tube 23 being rotated to a vertical position for delivery of a carrier to a customer or teller.

Accordingly, the new swing tube terminal construction is simplified, provides an effective and inexpensive construction changeable to meet various installation conditions for sending and receiving pneumatic carriers between stations connected by a single tube line; and provides a construction achieving all of the enumerated objectives, eliminating difficulties encountered with prior constructions, and solves problems and obtains new results in the art.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction shown or described.

Having now described the features, discoveries and principles of the invention, the manner in which the pneumatic tube system swing tube terminal construction is constructed, assembled and operated, the characteristics of the new construction, and the advantageous, new and useful results obtained; the new and useful structures, devices, elements, arrangements, parts, and combinations are set forth in the appended claims.

We claim:

1. A pneumatic system swing tube terminal construction including a terminal housing having carrier access door means; a pneumatic tube communicating with said housing for delivering and sending a pneumatic carrier to and from said housing; a single swing tube means having an open first end and a closed second end; means pivotally mounting the swing tube means generally adjacent the closed second end within the housing for swinging pivotal movement of the swing tube means first end between at least first and second positions; the swing tube means first end communicating with the pneumatic tube when said swing tube means is in the first position, and said first end communicating with the carrier access door means when said swing tube means is in the second position; airflow supply means operatively communicating with the swing tube means; drive means mounted within the terminal housing and operatively connected to the swing tube means for moving said tube means between the first and second positions; and air control means for selectively regulating the direction of the airflow through the swing tube means whereby a carrier can be drawn into the swing tube means through the open first end when said swing tube means is in either the first or second position and is maintained therein by the airflow, and subsequently, can be ejected from the swing tube means either toward the carrier access door means or into the pneumatic tube by a reversal of the airflow direction.

2. The construction defined in claim 1 in which the swing tube means drive means includes a bellcrank having first and second levers; in which motor means is operatively connected to the first lever for rotating said first and second levers; and in which the second lever is operatively engaged with the swing tube means, whereby said second lever moves the swing tube means upon rotation of the first lever by the motor means.

3. The construction defined in claim 2 in which the swing tube means includes a cam track extending generally longitudinally along the swing tube means; and in which roller means is mounted on the end of the second lever and is slidably engaged with said cam track for movement of the swing tube means.

4. The construction defined in claim 1 in which the swing tube means includes a section of pneumatic tube; in which cam track means is mounted on the outside surface of the tube and extends longitudinally along said tube; and in which the drive means includes roller means which slidably engages the cam track means for movement of the pneumatic tube section.

5. The construction defined in claim 4 in which cam track means includes first and second ends; in which the first end is pivotally mounted on the pneumatic tube section enabling the second end to have limited swinging movement; and in which resilient means is operatively engaged with said second end to provide override protection for the swing tube means.

6. The construction defined in claim 1 in which the swing tube means includes a section of pneumatic tube; in which the tube section is pivotally mounted within the housing; in which the pivotal mounting means includes a first pair of sleeves attached to the tube section and extending in diametrically opposite directions outwardly from said tube section; in which bearing means are engaged with the sleeves and pivotally support the sleeves within the housing; in which one of the sleeves has first and second open ends; and in which the first end communicates with the interior of the swing tube section, and in which the second end communicates with the airflow supply means; whereby the airflow moves through the tube section and said one sleeve for controlling movement of a carrier in said tube section.

7. The construction defined in claim 6 in which a baffle chamber is formed adjacent the swing tube section; in which a plurality of openings are formed on the tube section within the confines of the baffle chamber to provide communication between the baffle chamber and interior of the tube; and in which said one sleeve is mounted on and communicates with said baffle chamber.

8. The construction defined in claim 6 in which a second pair of sleeves are mounted within the terminal housing; in which the first pair of tube sleeves is telescopically engaged with the second pair of sleeves; and in which the bearing means are mounted between the individual sleeves of the first and second pairs of sleeves for pivotally mounting said first pair of sleeves with respect to said second pair of sleeves.

9. The construction defined in claim 1 wherein the system is operating under vacuum, in which the pneumatic tube extends generally vertically upwardly from the bottom of the terminal housing and terminates in an open end; in which the swing tube means is pivotally mounted within the housing above the pneumatic tube open end and extends in a vertical direction when in the first position, with the swing tube means open end being aligned with and adjacent to the pneumatic tube open end for receiving a carrier from said pneumatic tube; and in which the airflow supply means communicates with the swing tube means adjacent the closed end thereof whereby an incoming carrier is drawn into the swing tube means and maintained therein by the airflow.

10. In a terminal construction for pneumatic tube conveyor systems of a type in which a carrier is moved in either direction between terminals by motive pressure supplied through the tube to the carrier, in which a source of motive pressure communicates with the terminal construction, and in which air shifter means communicates with the source of motive pressure for changing the direction of said motive pressure in the tube; the terminal construction including a housing; a carrier access opening formed in the housing; swing tube means pivotally mounted within the housing for swinging movement between first and second positions; the axis of the swing tube means extending in a generally vertical direction when in said first position and in a generally horizontal direction when in said second position; the swing tube means having an open end and a closed end, said open end communicating with the system tube when in the first position for moving a carrier between the swing tube means and the system tube, said carrier being moved into and out of said swing tube means by said motive pressure; means supplying the motive pressure to the swing tube means adjacent the closed end; drive means operatively connected to the swing tube means for pivoting said swing tube means between the first and second positions; means retaining a carrier in the swing tube means during movement of the swing tube means between the first and second positions; and the air shifter means being adapted to change the direction of the motive force in the swing tube means after said swing tube means has moved between first position to second position to eject a carrier therefrom for delivery to the carrier access opening or for movement along the system tube.

11. The terminal construction defined in claim 10 in which the motive pressure supplied to the swing tube means adjacent the closed end is the means retaining a carrier in the swing tube means when the swing tube means moves between the first and second positions when the system is operating under vacuum.

12. The terminal construction defined in claim 10 in which the drive means includes a cam means mounted on the swing tube means, motor means supplying the force to move the swing tube means between the first and second positions, and means operatively connecting the motor means with the cam means for transmitting the moving force therebetween.

13. The terminal construction defined in claim 12 in which the cam means includes a cam block having a cam slot found therein; in which the cam block extends longitudinally along the swing tube means; and in which one end of the cam block is mounted on the swing tube means for limited swinging movement to provide override protection for the cam means.

14. A pneumatic system swing tube terminal construction including a terminal housing having carrier access door means; a pneumatic tube communicating with said housing for delivering and sending a pneumatic carrier to and from said housing; swing tube means having an open first end and a closed second end; a cam track extending generally longitudinally along the swing tube means; means movably mounting the swing tube means within the housing for swinging movement of the swing tube means first end between at least first and second positions; the swing tube means first end communicating with the pneumatic tube when said swing tube means is in the first position, and said first end communicating with the carrier access door means when said swing tube means is in the second position; airflow supply means operatively communicating with the swing tube means; drive means mounted within the terminal housing and operatively connected to the swing tube means for moving said tube means between the first and second positions; the drive means including a bellcrank having first and second levers and motor means operatively connected to the first lever for rotating said first and second levers; and roller means mounted on the end of the second lever and slidably engaged with the swing tube means cam track for movement of the swing tube means upon rotation of the first lever by the motor means; and air control means for selectively regulating the direction of the airflow through the swing tube means whereby a carrier is drawn into the swing tube means and maintained therein by the airflow and subsequently is ejected therefrom by a reversal of the airflow direction.

15. A pneumatic system swing tube terminal construction including a terminal housing having carrier access door means; a pneumatic tube communicating with said housing for delivering and sending a pneumatic carrier to and from said housing; swing tube means including a section of pneumatic tube having an open first end and a closed second end; cam track means mounted on the outside surface of the tube section and extending longitudinally along said tube section; means movably mounting the tube section with the housing for swinging movement of the tube section first end between at least first and second positions; the tube section first end communicating with the pneumatic tube when said tube section is in the first position, and said first end communicating with the carrier access door means when said tube section is in the second position; airflow supply means operatively communicating with the swing tube means; drive means mounted within the terminal housing and operatively connected to the swing tube means for moving said tube section between the first and second positions; the drive means including roller means, said roller means being slidably engaged with the cam track means for movement of the pneumatic tube section; and air control means for selectively regulating the direction of the airflow through the swing tube means whereby a carrier is drawn into the swing tube means and maintained therein by the airflow and subsequently is ejected therefrom by a reversal of the airflow direction.

16. A pneumatic system swing tube terminal construction including a terminal housing having carrier access door means; a pneumatic tube communicating with said housing for delivering and sending a pneumatic carrier to and from said housing; swing tube means including a section of pneumatic tube having an open first end and a closed second end; means pivotally mounting the tube section within the housing for swinging movement of the tube section first end between at least first and second positions; the tube section first end communicating with the pneumatic tube when said tube section is in the first position, and said first end communicating with the carrier access door means when said tube section is in the second position; airflow supply means operatively communicating with the swing tube means; the swing tube section pivotal mounting means including a first pair of sleeves attached to the tube section and extending in diametrically opposite directions outwardly from the tube section, one of said sleeves having first and second open ends with said first end communicating with the interior of the tube section and with the second end communicating with the airflow supply means; bearing means engaged with the sleeves and pivotally supporting the sleeves within the housing; drive means mounted within the terminal housing and operatively connected to the swing tube means for moving the tube section between the first and second positions; and air control means for selectively regulating the direction of the airflow through the swing tube means whereby a carrier is drawn into the swing tube section and maintained therein by the ariflow through the tube section and said one sleeve and subsequently is ejected therefrom by a reversal of the airflow direction.

17. Swing tube terminal construction for a pneumatic tube system operating under vacuum, including a terminal housing having carrier access door means; a pneumatic tube communicating with said housing for delivering and sending a pneumatic carrier to and from said housing; said pneumatic tube extending generally vertically, upwardly from the bottom of the terminal housing and terminating in an open end; swing tube means having an open first end and a closed second end; means pivotally mounting the swing tube means within the housing above the pneumatic tube open end for swinging movement of the swing tube means first end between at least first and second positions, the swing tube means extending in a vertical direction when in the first position with the swing tube means open end being aligned with and adjacent to the pneumatic tube open end for receiving a carrier from said pneumatic tube, and said first end communicating with the carrier access door means when said swing tube means is in the second position; airflow supply means operatively communicating with the swing tube means adjacent the closed end thereof; drive means mounted within the terminal housing and operatively connected to the swing tube means for moving said tube means between the first and second positions; and air control means for selectively regulating the direction of the ariflow through the swing tube means whereby a carrier is drawn into the swing tube means and maintained thereby by the ariflow and subsequently is ejected therefrom by a reversal of the airflow direction.

* * * * *